United States Patent
Siahaan et al.

(10) Patent No.: US 7,286,974 B2
(45) Date of Patent: Oct. 23, 2007

(54) VIRTUAL PC PRINTER DRIVER

(75) Inventors: Linden B. Siahaan, San Jose, CA (US); Andrew E. Nicholas, Bellevue, WA (US); David Ari Litwin, El Sobrante, CA (US); Michael P. Foley, Berkeley, CA (US); Omar H. Shahine, San Francisco, CA (US)

(73) Assignee: Workman Nydegger, Redmond, WA (US)

( * ) Notice: Subject to any disclaimer, the term of this patent is extended or adjusted under 35 U.S.C. 154(b) by 453 days.

(21) Appl. No.: 10/895,189

(22) Filed: Jul. 19, 2004

(65) Prior Publication Data

US 2006/0015316 A1     Jan. 19, 2006

(51) Int. Cl.
*G06F 9/44* (2006.01)

(52) U.S. Cl. ............................ 703/21; 717/148; 718/1; 719/324

(58) Field of Classification Search ................ 719/324; 703/21
See application file for complete search history.

(56) References Cited

U.S. PATENT DOCUMENTS

| 6,003,065 A | * | 12/1999 | Yan et al. ................... 709/201 |
| 6,598,087 B1 | * | 7/2003 | Dixon et al. ................ 709/236 |
| 6,788,428 B1 | * | 9/2004 | Shimokawa ............... 358/1.15 |

* cited by examiner

*Primary Examiner*—Paul Rodriguez
*Assistant Examiner*—Jonathan Teets

(57) ABSTRACT

A method and system for printing from a guest operating system that executes in a virtual PC. In the guest operating system, a special printer driver (or extension to an existing printer driver) is installed. The printer driver receives print data from the guest operating system and applications that execute therein. The printer driver or an extension thereof forwards the print data or data derived therefrom to a host component that executes in a host operating system. The host component forwards the print data or data derived therefrom to the normal print mechanisms within the host operating system.

24 Claims, 4 Drawing Sheets

VIRTUAL PC PRINTER DRIVER

FIELD OF THE INVENTION

The invention relates generally to computers, and more particularly to virtual computers.

BACKGROUND

With the multitude of operating systems and versions thereof, developers have created software that provides virtual machines (sometimes referred to as virtual PCs). A virtual PC is a software-created environment that may appear, to the operating system and applications that execute therein, to have most or all the elements associated with an actual PC. The software-created environment may be so complete that the operating system and applications that execute on a virtual PC may not be able to determine that they are executing in a virtual environment.

Providing virtual PCs is useful for many reasons including debugging and supporting applications designed to execute on multiple versions of one or more operating systems, having access on a single machine to applications that are only available for different operating systems, and so forth. To execute multiple operating systems on one actual computer, a user may load a primary operating system on the computer, load software to create one or more virtual PCs, and then load one or more other operating systems that execute in the one or more virtual PCs. This allows, for example, an Apple® (or other) operating system to provide a virtual PC to host a Microsoft® operating system, a UNIX® operating system, a LINUX® operating system, another Apple® operating system, or some other operating system.

Providing a virtual PC that seamlessly and effectively provides all the functionality of a real PC has eluded those skilled in the art. This is particularly true with respect to printing functions associated with the virtual PC.

SUMMARY

Briefly, the present invention provides a method and system for printing from a guest operating system that executes in a virtual PC. In the guest operating system, a special printer driver (or extension to an existing printer driver) is installed. The printer driver receives print data from the guest operating system and applications that execute therein. The printer driver or an extension thereof forwards the print data or data derived therefrom to a host component that executes in a host operating system. The host component forwards the print data or data derived therefrom to the normal print mechanisms within the host operating system.

The method and system described herein are able to obtain print data from a guest operating system without resorting to hardware emulation to obtain that data. That is, in accordance with aspects of the invention, a printer port does not need to be emulated in order to print from a guest operating system and applications that execute therein. In accordance with other aspects of the invention, printing from a guest operating system may be performed without extensive user configuration.

Other advantages will become apparent from the following detailed description when taken in conjunction with the drawings, in which:

DETAILED DESCRIPTION

Exemplary Operating Environment

Figure 1:
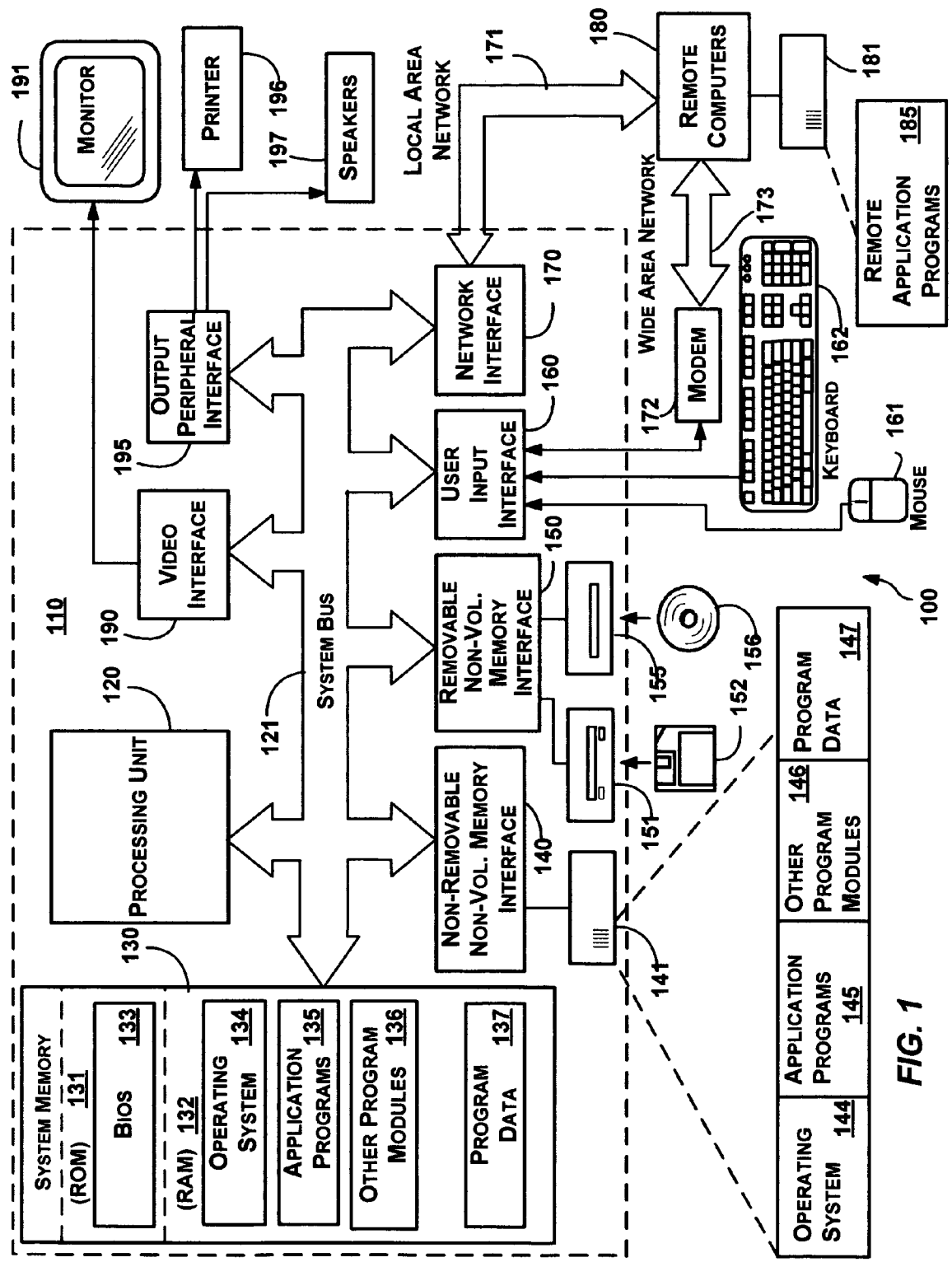
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Printer Driver

Figure 2:
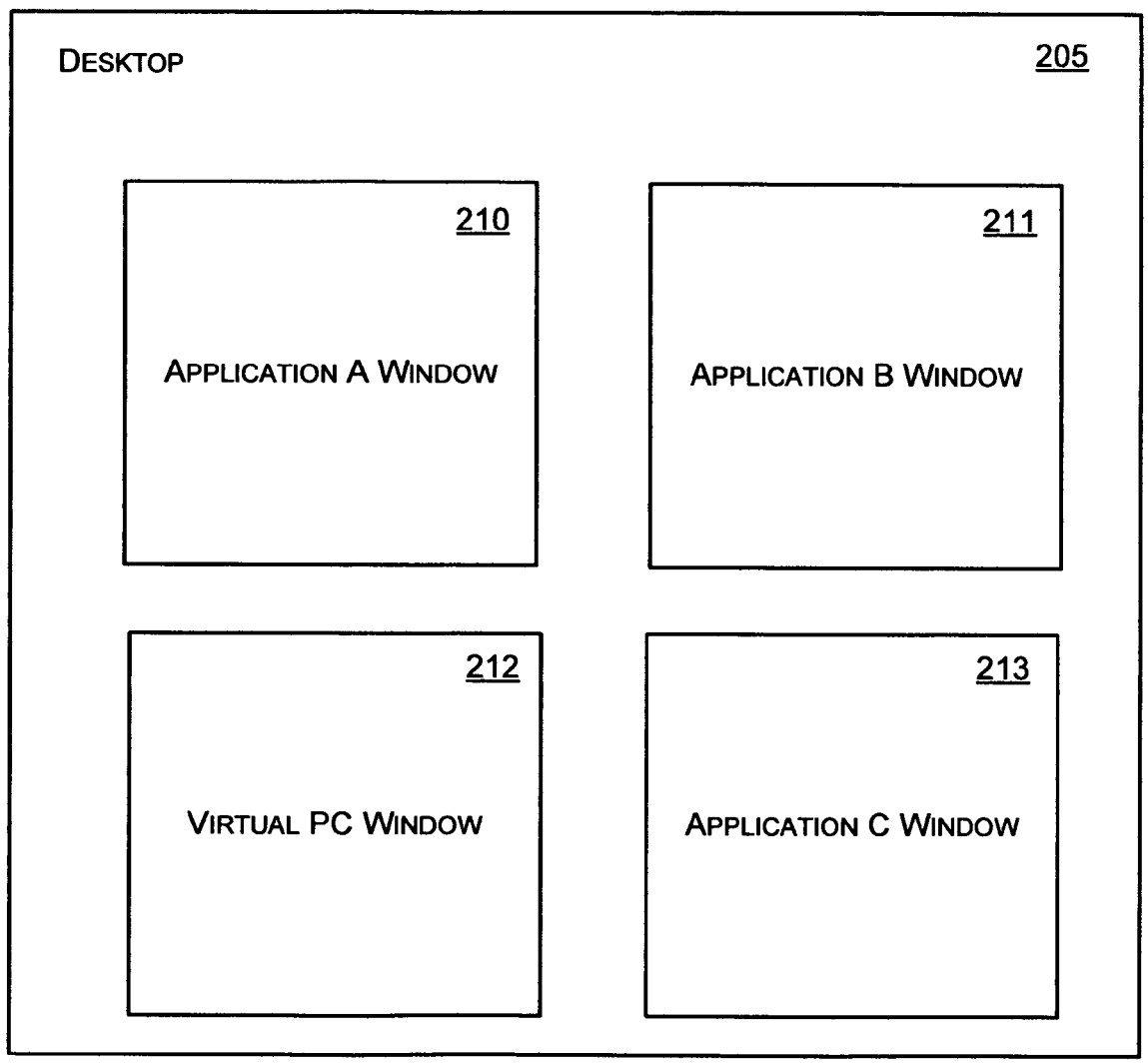
FIG. 2 shows a view of a graphical user interface that operates in accordance with various aspects of the invention.

FIG. 2 shows a view of a graphical user interface that operates in accordance with various aspects of the invention. In the user interface, there is a desktop 205 that includes four windows 210-213. Windows 210, 211, and 213 represent views of applications that execute on the operating system that is native to the device upon which the graphical user interface is shown. The native operating system is sometimes referred to as the host operating system or simply as the host. Virtual PC window 212 represents the graphical user interface of an operating system and related applications that execute on a virtual PC. The operating system that executes on the virtual PC is sometimes referred to as a guest operating system or simply as a guest. When maximized, the view shown in the virtual PC window 212 may be indistinguishable from a view shown if the guest operating system were run natively on the device.

Figure 3:
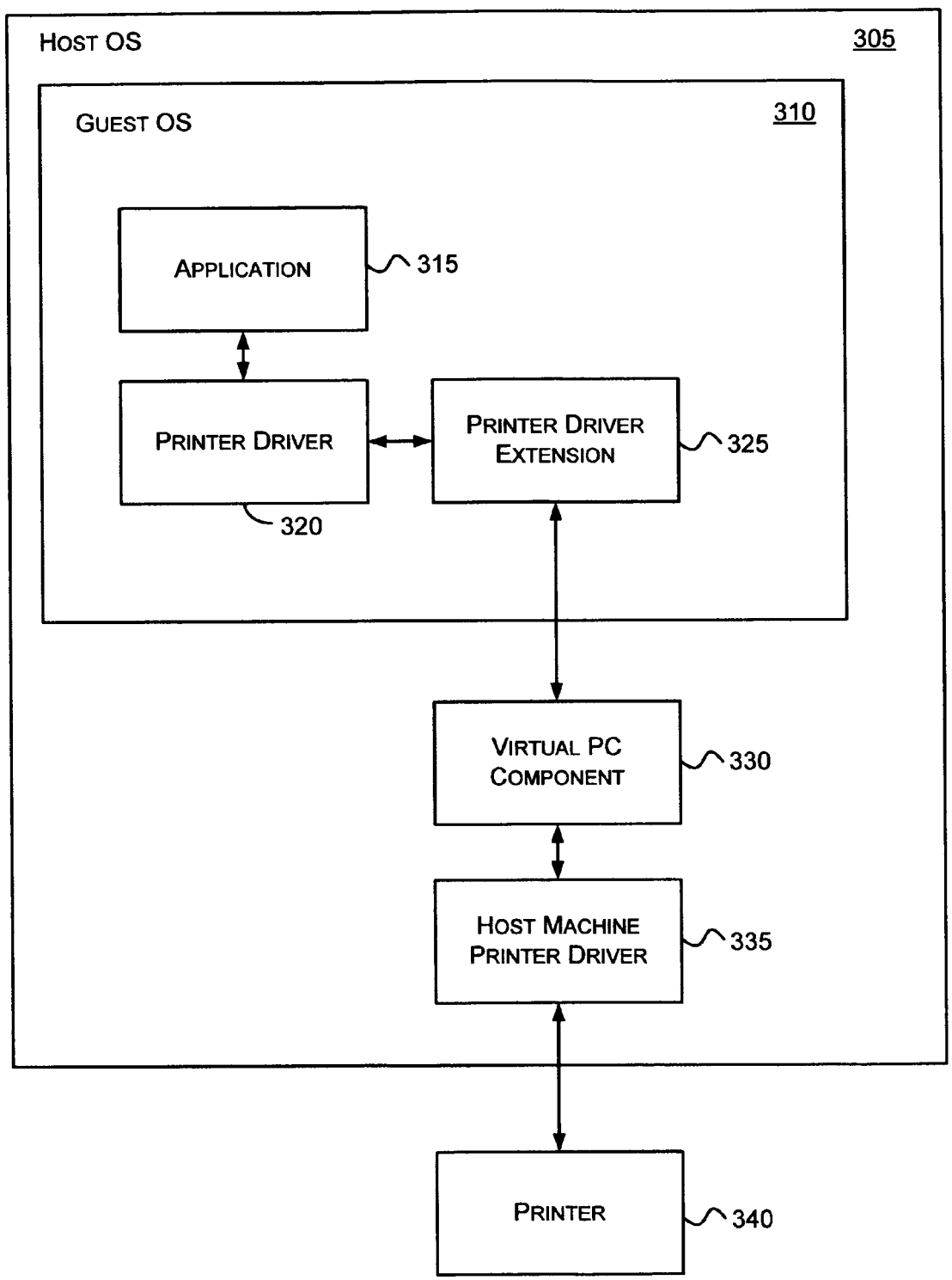
FIG. 3 is a block diagram that illustrates exemplary components that may be used to practice the invention in accordance with various aspects of the invention.

FIG. 3 is a block diagram that illustrates exemplary components that may be used to practice the invention in accordance with various aspects of the invention. A host operating system (OS) 305 provides a virtual PC for a guest OS 310. The guest OS 310 may include an application 315, a printer driver 320, and a printer driver extension 325. The host OS 305 includes a virtual PC component 330, and a host machine printer driver 335. Also shown is a printer 340.

The application 315 may interact with the printer driver 320 when the application is attempting to print to a printer. In one embodiment of the invention, the printer driver 320 comprises a generic PostScript® printer driver. A generic Postscript® printer driver may receive data in a variety of formats and translate the data into PostScript®. It will be understood, however, that other printer drivers and formats may be used without departing from the spirit or scope of the present invention.

In another embodiment of the invention, the graphic data that is sent from application 315 and received by the printer driver 320 is sent unmodified by the printer driver 320 to the printer driver extension 325. In other words, the raw data that is received from application 315 for printing by the printer driver 320 is sent to the printer driver extension 325. This raw data is then sent to the virtual PC component 330 and may then be translated by the virtual PC component 330 into another format or may be sent directly to the host machine printer driver 335. Sending the raw data that is received from the application 315 to the host machine printer driver 335 may be particularly useful when the host and guest operating systems are similar or identical (e.g., a Windows® operating system hosting another Windows® operating system) as no translations or loss of fidelity may occur.

The printer driver extension 325 receives the output from the printer driver 320 and sends the output outside the virtual PC on which the Guest OS 310 executes to the virtual PC component 330. In one embodiment, the printer driver extension 325 transfers the output it receives from the printer driver 320 to the virtual PC component using direct memory transfers of 4K sized blocks. It will be understood, however, that many other transfer mechanisms and/or block sizes may be used without departing from the spirit or scope of the invention. The printer driver extension 325 may wait until it has received a predefined or selected size of output from the printer driver 320 before it sends the output to the virtual PC component 330.

The printer driver extension 325 may be structured to intercept the output from the printer driver 320 and to stop the printer driver 320 from sending the output to a virtual printer port (not shown) (e.g., LPT1) associated with the Guest OS 310. This may be done to prevent any output from the printer driver 320 from being transmitted to the Host OS 305 through port emulation mechanisms.

The printer driver 320 may inform the printer driver extension 325 when a print job is finished. This may be done through the use of an API call, a callback, or some other mechanism without departing from the spirit and scope of the invention.

The virtual PC component 330 sends the output received from the printer driver extension 325 to the host machine printer driver 335 which then sends the output to the printer 340. The virtual PC component 330 may wait until a complete print job is received before it sends the print job to the host machine printer driver 335. Alternatively, the virtual PC component 330 may send data to the host machine printer driver 335 as the data is received.

The host machine printer driver 335 may translate the output received from the virtual PC component 330 into a format suitable for the printer 340. In some embodiments of the invention, no translation may be necessary as the printer 340 may be configured to accept and print the output without translation. For example, if the printer driver extension 325 sends PostScript®-formatted data to the virtual PC component 330 which then sends the PostScript®-formatted data to the host machine printer driver 335 and the host machine printer driver 335 prints to a PostScript®-capable printer, no translation may be required.

The printer driver 320, the printer driver extension 325, and/or the host machine printer driver 335 may be implemented using APIs, through an OS mechanism appropriate for the particular OS, or otherwise without departing from the spirit or scope of the invention.

The printer driver extension 325 may be installed with or after the Guest OS 310 is installed. In one embodiment of the invention, the functionality of the printer driver extension 325 may be included in the printer driver 320. In this embodiment, there is no need to have a separate printer driver extension 325. It will be understood that implementing the functionality of the printer driver extension 325 in a software module separate from an existing printer driver may be simpler than creating a new printer driver and adding the functionality of the printer driver extension 325 because all the routines of an existing printer driver may not need to be implemented in the printer driver extension 325. By creating a printer driver extension instead of a new printer driver, a developer may be able to provide just those methods needed to receive and forward output from the printer driver and to stop the printer driver from printing to an emulated hardware device.

The virtual PC component 330 that communicates with the printer driver extension 325 may also be installed with the host OS 305 or at a later time as a separate installation. The virtual PC component 330 will typically comprise many other components (not shown) in addition to the component that communicates with the printer driver extension 325.

The Host OS 305 may be modified or extended to provide the user with a mechanism for choosing to which printer output from each guest OS may be printed. Each guest OS may be associated with its own unique printer or it may associated with a printer to which other guest OSes are associated.

The guest OS 310 may also be modified to dispose of any print jobs in a print queue that are directed to the printer driver 320 upon boot up. For example, the guest OS 310 may be shut down or cease operation in the middle of printing a list of print jobs. Rather than resuming these print jobs upon startup, the print jobs in the print queue may be cancelled or deleted. In another embodiment of the invention, however, the guest OS 310 may resume printing of the print jobs in the print queue after the guest OS 310 has booted up and started normal execution.

It will be recognized that the system described above has many advantages over other mechanisms for printing from a guest OS. One other such mechanism includes emulating a printer port for the guest OS. This mechanism has many problems including knowing when the print job has completed, extraneously printing pages (e.g., at boot up because of boot sequence port transmissions), the slow speed with which the print job is transferred, determining the format of the print job (e.g., PostScript® or otherwise), issues related to what happens if the guest OS is paused, hibernated, or stopped, and the like.

Another mechanism for printing from a guest OS comprises an Epson®-emulated mode in which data received at an emulated printer port is translated into an Epson® dot matrix printer format. This mechanism suffers from low print quality, slow speed, and a small palette of color.

Furthermore, the alternative mechanisms described above also generally suffer when an application attempts to use the emulated printer port for a purpose other than printing (e.g., for scanning, Zip® drives, and the like). Using an emulated printer port for one of these purposes may cause extraneous pages to be printed or have other side effects.

Another mechanism for printing from a guest OS comprises configuring the guest OS to print to a network printer. While this mechanism is more reliable for detecting print jobs and forwarding them appropriately, it may require a great deal of configuration to initially configure a guest OS to print to a network printer.

Another mechanism for printing from a guest OS comprises giving the guest OS control of a USB port that is connected to the desired printer. While this mechanism is also more reliable for printing, it also may require a great deal of configuration to set up the guest OS to print to the desired printer including finding and installing drivers for the guest OS for the selected printer. In addition, while the guest OS has control of the USB port, the printer may not be available for use by the host OS.

Printing from a guest OS to a host OS through a printer driver as describe previously may be used instead of or in addition to the above mechanisms.

Figure 4:
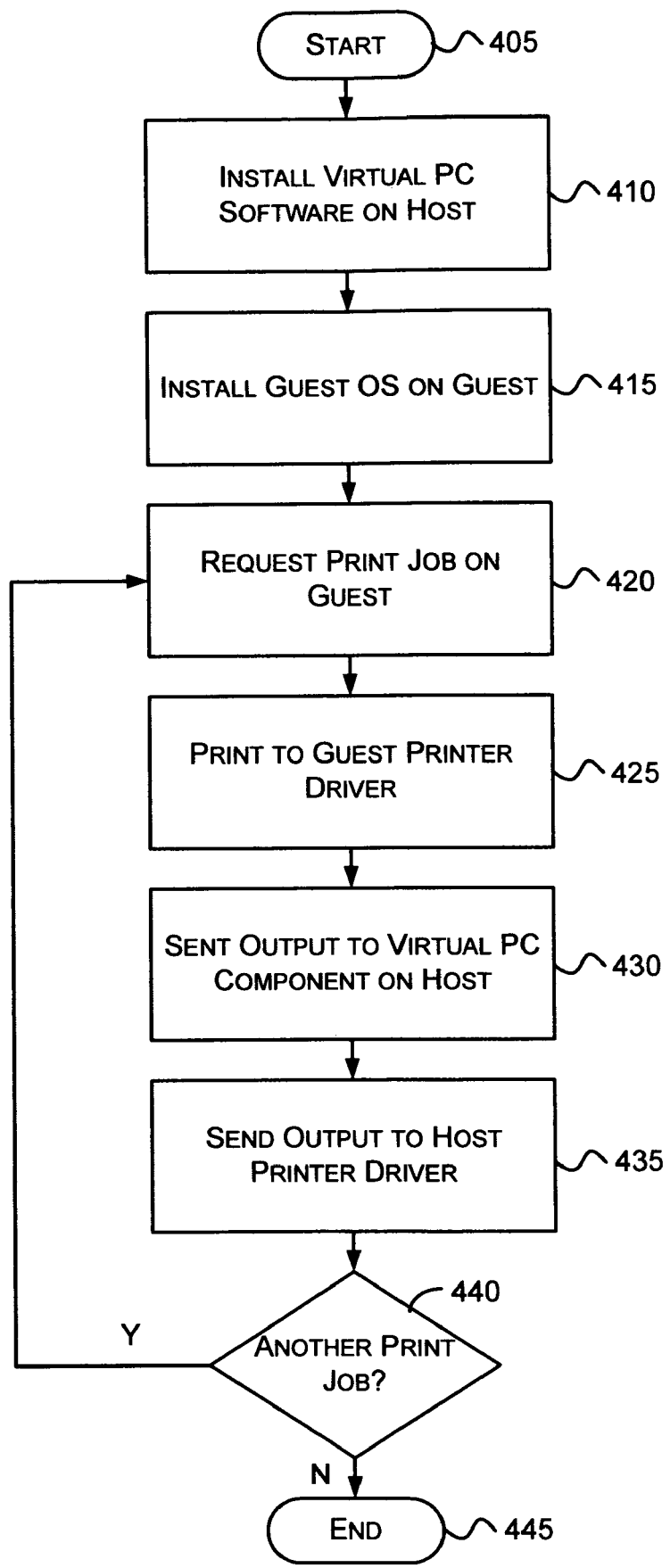
FIG. 4 is a flow diagram that generally represents exemplary steps that may occur to print from a virtual PC environment in accordance with various aspects of the invention.

FIG. 4 is a flow diagram that generally represents exemplary steps that may occur to print from a virtual PC environment in accordance with various aspects of the invention. The process begins at block 405. At block 410 the virtual PC software is installed on the host (if it has not already been installed). At block 415, the guest OS is installed on the guest.

At block 420, a print job is requested by an application. The print job is printed to the guest printer driver at block 425. At block 430, the output from the guest printer driver is sent to a virtual PC component on the host. At block 435, the virtual PC component on the host sends the output to the host printer driver (or equivalent). The host printer driver (or equivalent) prints to a printer using the output.

At block 440, a determination is made as to whether another print job needs to be printed. If not, the process ends at block 445. Steps 420-435 of the process above may be performed each time an application attempts to print.

It will be recognized that aspects of the invention described herein may be applied to many operating systems, currently existing and later developed, without departing from the spirit or scope of the invention. For example, any operating system that is configured with a virtual component (e.g., printer driver extension 325) that obtains output from a printer driver (or its equivalent) and sends this output instead to a component executing on the host OS (e.g., virtual PC component 330) may use aspects of the invention described herein to obtain reliable printing from a virtual PC. The virtual component that obtains output from the printer driver may need to reformat the output to Postscript® or some other format that the component executing on the host is expecting.

As can be seen from the foregoing detailed description, there is provided an improved method and system for printing from a virtual PC. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system which includes a host operating system and a virtual PC operating within the host operating system, the virtual PC having a guest operating system and at least one application within the guest operating system, the virtual PC providing a software-created environment which appears to the guest operating system and the at least one application to be an actual PC, a computer-readable storage medium having stored thereon computer-executable instructions that, when executed by a processor of the computing system, cause the computing system to implement a method for requesting that print data be sent from an application of the virtual PC and through the host operating system to a peripheral printer, the method comprising:
   obtaining print data from an application that executes within the guest operating system of the virtual PC, the guest operating system of the virtual PC being hosted by the host operating system of the computing system;
   sending the print data from the application within the guest operating system out of the virtual PC and to a host component which executes within the host operating system, wherein the print data is sent out of the virtual PC to the host component without passing through an emulated hardware printer port in the virtual PC; and
   forwarding the print data from the host component to a peripheral printer connected to host operating system, thereby enabling the peripheral printer to receive the print data in a format which is native to the peripheral printer, and to print the print data.

2. The computer-readable medium of claim 1, wherein obtaining the print data from an application comprises obtaining the print data by a printer driver within the guest operating system.

3. The computer-readable medium of claim 2, wherein obtaining the print data from the application comprises obtaining the print data by a printer driver extension that communicates with the printer driver.

4. The computer-readable medium of claim 2, wherein the printer driver provides the print data in a PostScript® format.

5. The computer-readable medium of claim 2, further comprising receiving application print data in a first format from the application that executes within the guest operating system and providing the print data in a second format.

6. The computer-readable medium of claim 1, wherein the host operating system is a Windows® operating system and the guest operating system is a non-Windows® operating system.

7. The computer-readable medium of claim 1, wherein the host operating system and the guest operating system or of the same type.

8. The computer-readable medium of claim 1, wherein sending the print data to a host component that executes within the host operating system comprises sending at least some of the print data in a selected or predetermined block size.

9. The computer-readable medium of claim 8, wherein sending the print data to a host component that executes within the host operating system further comprises sending the print data via a direct memory transfer.

10. In a computing system which includes a host operating system and a virtual PC operating within the host operating system, the virtual PC having a guest operating system and at least one application within the guest operating system, the virtual PC providing a software-created environment which appears to the guest operating system and the at least one application to be an actual PC, a computer-implemented method for requesting that print data be sent from an application of the virtual PC and through the host operating system to a peripheral printer, the method comprising:
    sending print data from an application that executes within the guest operating system of the virtual PC to a special print driver also executing in the guest operating system of the virtual PC.
    sending the print data from the special print driver of the guest operating system out of the virtual PC and to a host component executing within the host operating system;
    sending the print data from the host component to a host driver within the host operating system, the host driver being operable to process print requests that execute on the host operating system and forward the print requests to a peripheral printer in a format native to the peripheral printer; and
    forwarding, by the host driver of the host operating system all print data to the peripheral printer connected to the host operating system, the print data being forwarded in the native format of the peripheral printer, thereby enabling the peripheral printer to print the print data provided by the application of the guest operating system through the host driver of the host operating system.

11. The method of claim 10, wherein the special print driver transforms the print data from a first format into a second format.

12. The method of claim 11, wherein the first format comprises a proprietary format and the second format comprises a generic format.

13. The method of claim 10, wherein the guest operating system and the host operating system are of different types.

14. The method of claim 10, wherein the guest operating system and the host operating system are of the same types.

15. The method of claim 14, wherein the print data is sent unmodified from the special print driver to the host component.

16. The method of claim 10, further comprising sending some of the print data to an emulated hardware printer port associated with the guest operating system and forwarding the print data from the emulated hardware printer port to a printing component of the host operating system.

17. In a computing system that includes a host computer having a host operating system installed thereon and a virtual PC operating within the host operating system of the host computer, the virtual PC having a guest operating system and at least one application within the guest operating system, the virtual PC providing a software-created environment which appears to the guest operating system and the at least one application to be an actual PC, a print system for printing data from a virtual PC by passing the data from the virtual PC, through the host operating system of the host computer and to a peripheral printer, the print system comprising:
    a special print driver within the guest operating system of the virtual PC, the special driver being configured to receive print data from the one or more applications also within the guest operating system of the virtual PC;
    a host component within the host operating system of the host computer, the host component being arranged to communicate with, and receive print data from, the special print driver;
    a host print driver arranged to execute in the host operating system of the host computer and to receive print requests to print data from components of the host operating system, the host print driver being further configured to receive print data from the special print driver through the host component and transmit all print data to a peripheral printer in a format native to the peripheral printer, thereby enabling the peripheral printer to print the print data.

18. The system of claim 17, wherein the special print driver receives the print data in a first format and transforms the print data into a second format.

19. The system of claim 17, further comprising a print driver extension within the guest operating system, the print driver extension being arranged to communicate with the special print driver to receive the print data.

20. The system of claim 17, wherein the host component is further arranged to communicate with the special print driver or the print driver extension through direct memory transfers.

21. The system of claim 17, wherein the special print driver is further arranged to wait until it has received a selected amount of the print data from an application executing within the guest operating system before communicating the selected amount of the print data with the host component.

22. The system of claim 17, wherein the host component is further arranged to buffer the print data until an entire print job is received before sending the print data to a print component which forwards the print data to the peripheral printer.

23. The system of claim 17, wherein the host component is further arranged to send each block of the print data to a print component as each block is received.

24. The system of claim 17, wherein the host operating system is further arranged to associate a printer with each virtual PC which is configured to execute on the host operating system, wherein an associated printer comprises a printer on which print jobs from an associated virtual PC are printed.

* * * * *